United States Patent
Fontan et al.

[15] 3,677,572
[45] July 18, 1972

[54] STRADDLE TRACTORS

[72] Inventors: Andre Fontan, 11, rue Nationale, Nogaro; Rene Benac, Avenue Saint Roch, Mirande, both of France

[22] Filed: Oct. 19, 1970

[21] Appl. No.: 81,736

[30] Foreign Application Priority Data

Oct. 20, 1969 France..................................6935875

[52] U.S. Cl..............................................280/39, 214/392
[51] Int. Cl........................................................B62d 61/12
[58] Field of Search..........................280/38, 39, 42, 36, 34; 214/392, 394, 396

[56] References Cited

UNITED STATES PATENTS

| | | | |
|---|---|---|---|
| 3,572,742 | 3/1971 | Marker | 280/42 |
| 3,050,050 | 8/1962 | Kubicek | 280/42 X |
| 2,862,635 | 12/1958 | Christenson | 214/392 |

Primary Examiner—Philip Goodman
Attorney—Charles E. Baxley, Frank M. Nolan and Thomas E. Tate

[57] ABSTRACT

A straddle tractor of variable tractor width and utilizable on sloping ground, intended especially for carrying or hauling a machine for agricultural or public works, comprises four upright members having wheels articulated on their lower extremities and which are rigidly fixed together two by two by cross-members in order to form two rigid lateral flanks coupled to each other by at least one upper arm articulated on the said flanks in such manner that each flank is capable of pivoting with respect to the said arm about a horizontal axis, each of the two lateral flanks being further attached to the upper arm by means of a member of variable length articulated both on the arm and on the flank considered. Each of the members of variable length is constituted by an endless screw engaged in a tubular nut and capable of rotating with respect to the said nut by the action of driving means having two directions of rotation, transmission means fixed to the upper arm and comprising a device for reversing the direction of operation, being provided in order to transmit the movement of rotation to both the two rotating screws and permitting the direction of rotation of one screw to be reversed with respect to the other.

5 Claims, 7 Drawing Figures

Patented July 18, 1972

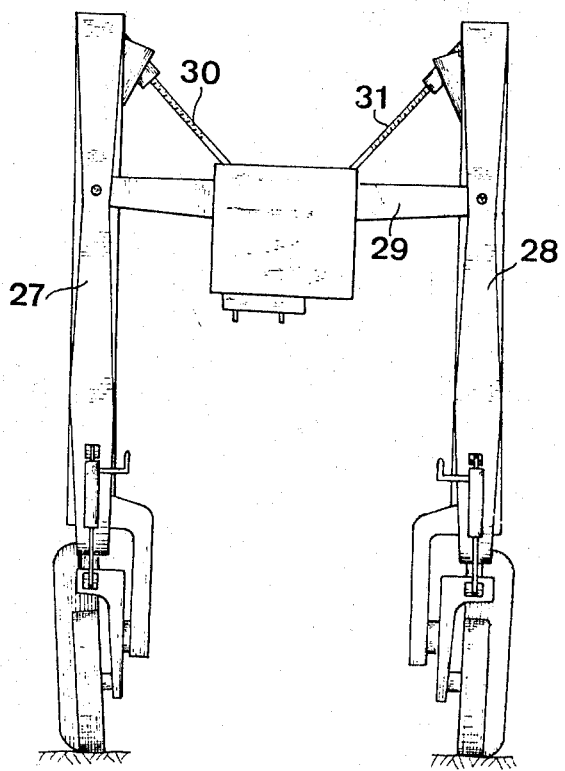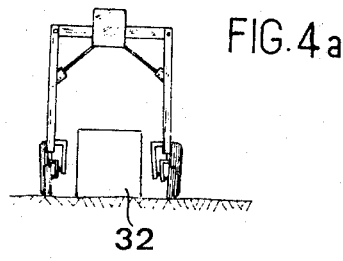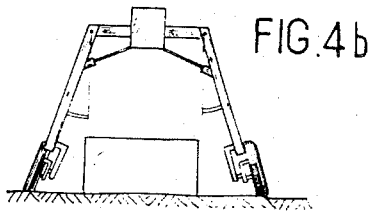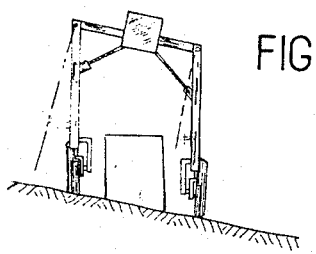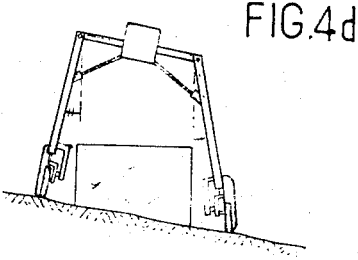

STRADDLE TRACTORS

The invention relates to a straddle tractor permitting the carrying or hauling of a machine intended for different kinds of work, especially agricultural work or public works. It will be recalled that straddle tractors are vehicles in which the wheels are necessarily arranged on each side of an elongated element, for example a row of vines, or a row of plants, the upper part of the chassis being located above this element.

Straddle tractors are known which are essentially constituted by upright members, rigidly fixed to each other and at the lower extremity of which the wheels are articulated. In certain tractors, these wheels are mounted on the upright members by means of telescopic legs which enable these tractors to be used on sloping ground.

However, these telescopic legs prove to be fragile in the case of machines intended to work under conditions which are sometimes difficult. Furthermore, the adjustment of the track width of these tractors is also obtained by means of fragile members such as a telescopic mounting or means which are not very practical in application, necessitating manual mechanical operations such as bolting, unbolting, etc.

In addition, tractors also exist in which the two rigid lateral flanks are articulated on a coupling arm in order to obtain a deformable assembly. In certain cases, the relative position of the two flanks and the coupling arm is regulated by a jack permitting the flanks to be kept vertical on sloping ground in order to ensure stability of the tractor. In other cases, this relative position is regulated by means of an endless screw engaged in pivoted nuts provided on both the two lateral flanks. An operating crank-handle permits the rotation of this screw and in consequence its screwing or unscrewing in the nuts fixed on the flanks. By this means, the latter can be moved away or brought closer together so as to regulate the track width of the said tractor.

The above-mentioned jack systems have serious disadvantages. Accurate regulation of the relative position of the flanks and the arm is awkward to effect; in addition, when once this regulation has been made, it frequently happens that the relative position of the flanks and the arm is modified, since jack systems do not provide any real locking of these elements. This position may for example be modified due to a fluid-tightness fault in the joints of the jack.

In addition, the known devices with jacks or endless screws are incapable of ensuring simultaneously the maintenance of the verticality of the flanks on sloping ground and the regulation of the track width of the tractor. No device exists which is capable of synchronizing the variation of the angles formed by each of the lateral flanks with the coupling arm, at the same time to give the track width of the tractor a desired value and to maintain on sloping ground the symmetry of the two flanks with respect to a central vertical plane so that the center of gravity of the vehicle and eventually of the load which may be suspended between its flanks may be projected on the center of the supporting polygon of the said vehicle with a view to ensuring its stability.

Now, for a straddle tractor intended to work on any ground and to straddle elements of variable widths, it is particularly important to take simultaneous advantage of good stability and an adjustable width of track.

The present invention has the object of providing a robust straddle tractor having a track width adjustable in an accurate manner and utilizable on sloping ground. A tractor of this kind comprises four upright members, at the lower extremities of which the wheels are articulated, and which are fixed together two by two by cross-members in order to constitute two rigid lateral flanks. These flanks are coupled together by at least one upper arm articulated on the flanks in such manner that each of them is capable of pivoting with respect to this arm about a horizontal axis. The upper arm is intended to be arranged above the elongated element to be straddled. Each of the two lateral flanks is also attached to the upper arm by means of a member of variable length, articulated on this arm and on the flank considered.

According to the invention, each of the said members of variable length is constituted by an endless screw engaged in a tubular nut and capable of rotating with respect to this latter by the action of driving means with two directions of rotation. Transmission means rigidly fixed on the upper arm and comprising a device for reversing the direction of running, are provided in order to transmit the movement of rotation to both the two rotating screws and to permit reversal of the direction of rotation of one screw with respect to the other.

On direct transmission, the drive in rotation of the two endless screws effects the screwing of one screw into its nut and the unscrewing of the other. The angle of one lateral flank with the upper arm increases while the angle of the other flank with this arm is reduced by a proportional amount. The synchronized variation of these angles produces a deformation of the vehicle which is subjected to a kind of dislocation. The rotation of the endless screw is stopped when the lateral flanks are located in two planes which are both symmetrical with respect to the central vertical plane of the vehicle, the center of gravity of which is therefore substantially projected to the center of its supporting polygon. The vehicle is thus adapted to move in a stable manner over sloping ground. It should be noted that if the lateral flanks are parallel at the beginning of the rotation of the endless screws, they will so remain constantly until they both reach vertical positions.

On reversed transmission, the two screws are screwed or unscrewed together. The angles formed by the two lateral flanks with the upper arm increase or diminish by a proportional amount, which enables the track width of the tractor to be regulated without affecting its stability since the center of gravity of the vehicle remains practically stationary.

It will further be noted that the endless screws provide accurate regulation of the above-mentioned angles, without risk of variation either in course of time or accidentally.

The transmission means are preferably designed to transmit a movement of rotation of equal speed to the two screws (either in one direction or in the opposite direction of one with respect to the other), these screws having threads of equal pitch. In this case there are obtained substantially equal angular variations of the angles already mentioned (the angle formed by one flank with the upper arm and the angle formed by the other flank with the upper arm).

In addition, according to a particular form of construction, the transmission means comprise a tilting gear system capable of being arranged, by tilting, in two positions determined by operating means: one in which the two screws are driven by the same gear system, the other in which the two screws are driven by two gear systems rotating in opposite directions. There is thus obtained a reversing device for the running direction having a simple structure, which enables the direction of rotation of one of the screws to be reversed while the other continues to turn in the same direction. The speeds of rotation in one direction or the other remain identically the same in absolute values.

Furthermore, with a view to increasing the strength of the vehicle, each endless screw can be arranged in a vertical plane along one of the sides of a triangle, the two other sides of which are constituted, on the one hand by the upper arm, and on the other hand by the outline of the flank considered on this vertical plane. When the two endless screws are established in given positions, there is thus obtained an extremely rigid triangular structure.

The driving means for the endless screws are preferably hydraulic.

The principle of the invention will be better understood from the description which follows below of forms of embodiment of the invention given by way of examples only and not in any limitative sense, reference being made to the accompanying drawings, in which:

FIG. 3 shows diagrammatically another form of construction of a straddle tractor according to the invention;

FIGS. 4a, 4b, 4c and 4d show diagrammatically a straddle tractor in four different working positions.

Figure 1:
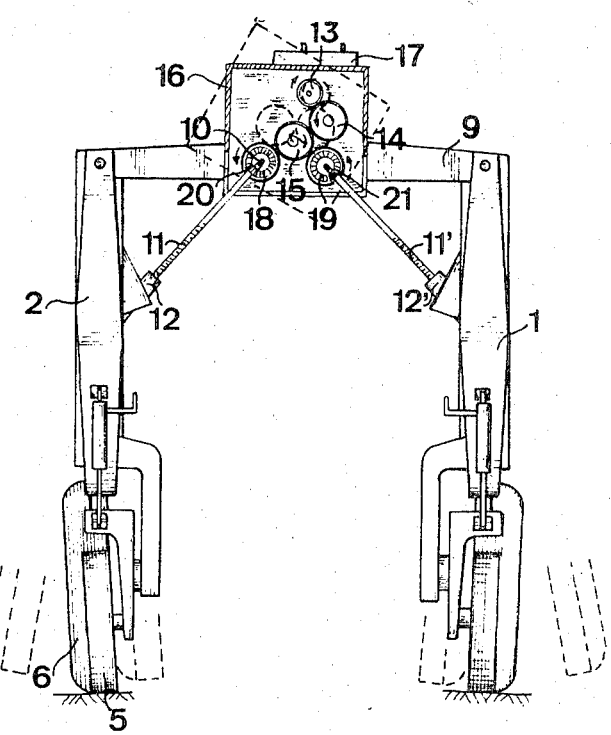
FIG. 1 is a front view of a straddle tractor according to the invention, in which certain conventional members have not been shown in order to facilitate understanding.
Figure 2:
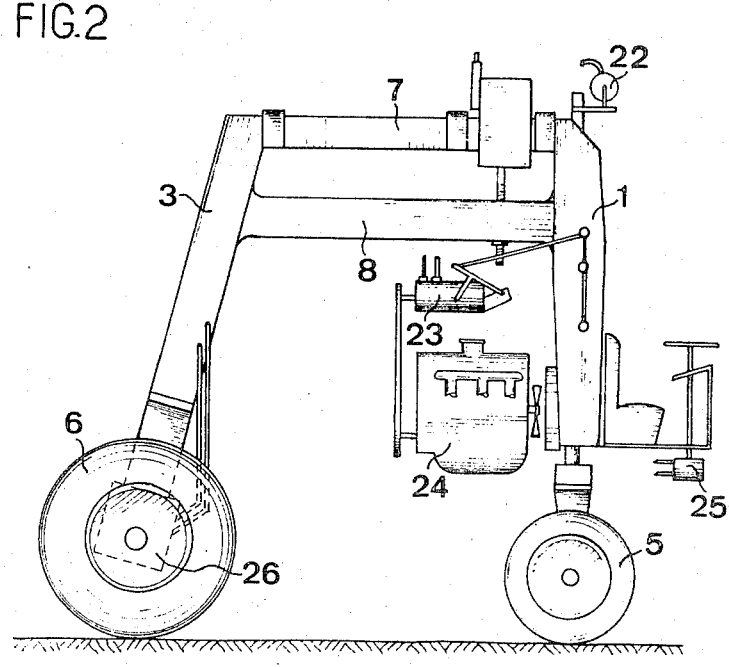
FIG. 2 is a profile view of this same straddle tractor.

A straddle tractor comprises four upright members as shown in FIGS. 1 and 2: two front uprights 1 and 2 and also two rear uprights 3 and 4, on the extremities of which are respectively articulated the two front wheels such as 5 and the two rear wheels such as 6. The uprights on the same side (1 and 3 and also 2 and 4) are fixed together by cross members such as 7 and 8. The upper cross members 7 are coupled together by an arm 9 on which they are articulated.

Thus, as can be seen from FIG. 1, the angles formed by the arm 9, on the one hand with the plane of the uprights 1 and 3, and on the other hand with that of the uprights 2 and 4, are variable and can be regulated to pre-determined values. On the central portion of the arm 9 are articulated the extremities of two sheaths 10 and 10' guiding endless screws 11 and 11', the lower extremities of which are engaged in pivoted tubular nuts 12 and 12', articulated on both the two cross-members 8. Rotation of one of the screws 11 or 11' about its own axis effects the screwing or unscrewing of this latter in its tubular nut and in consequence effects an increase or reduction of the value of the angle formed by the arm 9 with the plane of the uprights 1 and 3 or 2 and 4.

The driving means for rotating the screws 11 and 11' are constituted by a set of three gear systems 13, 14 and 15, enclosed in a tilting casing 16 and driven by a hydraulic motor shown diagrammatically at 17 and rigidly fixed on the said casing. The tilting casing 16 may occupy two positions: in one position (shown in full lines in FIG. 1), the gear 15 engages with two gears 18 and 19, articulated on the arm 9 and driving through bevel gears 20 (for the gear system 18) and 21 (for the gear system 19) the screws 11 and 11'. In the other position shown in broken lines in FIG. 1, the gear 14 identical with the gear 15, drives the gear 18, while the gear 15 is always engaged with the gear 19.

It will thus be seen that in the first position, the two gears 20 and 21, driven by the same gear 15, rotate in the same direction, while in the second position they rotate in opposite directions, since they are driven by gears 14 and 15 which themselves rotate in opposite directions. The gears 14 and 15 are identical, as are also the gears 18 and 19; irrespective of the relative direction of rotation of one screw 11 with respect to the other 11', the speeds of rotation of these screws are equal and in consequence, since these screws are identical and have the same pitch, they pass into or out of the tubular nuts 12 and 12' by an equal length during the same time of rotation. Thus, the angle of the arm 9 with the plane of the uprights 1 and 3 varies substantially by the same amount as the angle of the arm 9 with the plane of the uprights 2 and 4, due to the effect of the driving means described above.

In addition, the tractor is equipped with certain conventional members which will only be mentioned: steering jack 22, hydraulic pump 23 driven by a motor 24, assisted steering distributor 25, hydraulic driving motor 26 for the rear wheels, etc.

In an alternative form, there has been shown in FIG. 3 a straddle tractor in which the lateral uprights 27 and 28 are extended above their coupling arm 29. The endless screws 30 and 31 may thus be articulated on cross members which couple together the upper extremities of the uprights, such as 27 and of the uprights such as 28.

The operation of this tractor is similar to that previously described; the only difference consists in that the pivoting of the lateral flanks is obtained by reaction and not by direct action as in the case of the tractor of FIGS. 1 and 2. These arrangements make it possible to increase the clearance space located between the uprights, this space being completely free of members capable of interfering with the housing of a work machine suspended from the tractor.

FIGS. 4a, 4b, 4c, and 4d show diagrammatically the various possibilities of a tractor according to the invention. In FIG. 4a, the tractor is working on flat ground; its two lateral flanks are vertical and are arranged on each side of an element 32 straddled by the tractor and which may be formed for example by a row of vines.

In FIG. 4b, the element to be straddled is wider and the lateral flanks of the tractor have been opened out by the action of the endless screws. Due to the synchronization of the rotation of these screws, the two flanks have pivoted through the same angle with respect to their vertical position, and the center of gravity of the vehicle remains on the same vertical line.

In FIG. 4c, there is shown the same tractor working on sloping ground. It can be seen that the two lateral flanks have been caused to pivot through the same angle in the same direction, so as to remain parallel. This pivotal movement caused by the endless screws is obtained after actuation of the device for reversing the direction of rotation of one screw with respect to the other; it stops when the flanks have both taken a vertical position, the upper arm being parallel to the line of slope of the ground. In this position, the center of gravity of the vehicle is projected substantially at the center of the supporting polygon of the vehicle, which in consequence has excellent stability.

In FIG. 4b, the tractor shown is intended to straddle a wider element on sloping ground. The endless screws have effected the outward movement of the two lateral flanks through the same angle with respect to their vertical position, in order to increase the track width of the tractor. The two flanks thus remain in symmetrical planes with respect to the central vertical plane, and the center of gravity is also projected into the central zone of the supporting polygon of the vehicle, thereby ensuring its stability.

There can thus be appreciated the advantage of the tractor according to the invention, which combines an adjustable track width with the ability to work in complete safety on sloping ground.

It will of course be understood that the present description does not in any way limit the scope of the invention which is on the contrary widened to include all the alternative forms within the scope of those skilled in the art.

What we claim is:

1. A straddle tractor of variable track width and utilizable on sloping ground, comprising four upright members at the lower extremities of which are articulated wheels and which are rigidly fixed together two by two by cross members in order to form two rigid lateral flanks, said flanks being coupled to each other by at least one upper arm articulated on said flanks in such manner that each flank is capable of pivoting with respect to said arm about a horizontal axis, each of the two lateral flanks being further attached to the upper arm by means of a member of variable length articulated on said arm and on the flank considered, said straddle tractor being characterized in that each of the members of variable length is constituted by an endless screw engaged in a tubular nut and capable of rotating with respect to said nut by the action of driving means having two directions of rotation, transmission means fixed to the upper arm and comprising a reversing device for the direction of operation being provided in order to transmit said movement of rotation to both the two rotating screws and permitting the direction of rotation of one screw to be reversed with respect to the other.

2. A straddle tractor as claimed in claim 1, characterized in that said transmission means are provided so as to transmit a movement of rotation of equal speed to the two endless screws, either in one direction or in the opposite direction of one with respect to the other, said screws having threads of equal pitch.

3. A straddle tractor as claimed in claim 2 characterized in that said transmission means are constituted by a tilting gear system capable of being arranged by tilting in two pre-determined positions by operating means, the two screws being driven in one position by the same gear while in the other position, the two screws are driven by two gears rotating in opposite directions.

4. A straddle tractor as claimed in claim 3 characterized in that each endless screw is arranged in a vertical plane along one of the sides of a triangle, the two other sides of which are constituted, on the one hand by the upper arm and on the other hand by the trace of the flank considered on this vertical plane.

5. A straddle tractor in accordance with claim 4 characterized in that the said driving means of the endless screws are hydraulic.

* * * * *